US010852781B2

(12) United States Patent
Meriaz et al.

(10) Patent No.: US 10,852,781 B2
(45) Date of Patent: Dec. 1, 2020

(54) SYNCHRONIZED DISPLAY FOR A WEARABLE MOBILE TERMINAL

(71) Applicant: MBTE Holdings Sweden AB, Gothenburg (SE)

(72) Inventors: Ran Meriaz, Warner Robins, GA (US); Yoram Meriaz, Tel-Aviv (IL); Alexander Tkachman, Holon (IL)

(73) Assignee: MBTE Holdings Sweden AB, Gothenburg (SE)

( * ) Notice: Subject to any disclaimer, the term of this patent is extended or adjusted under 35 U.S.C. 154(b) by 0 days.

(21) Appl. No.: 16/177,896

(22) Filed: Nov. 1, 2018

(65) Prior Publication Data

US 2019/0384364 A1     Dec. 19, 2019

Related U.S. Application Data

(60) Provisional application No. 62/684,333, filed on Jun. 13, 2018.

(51) Int. Cl.
| G06F 1/16 | (2006.01) |
| G06K 7/14 | (2006.01) |
| G06K 7/10 | (2006.01) |

(52) U.S. Cl.
CPC ............ *G06F 1/1696* (2013.01); *G06F 1/163* (2013.01); *G06F 1/1698* (2013.01); *G06K 7/1413* (2013.01); *G06K 7/1417* (2013.01); *G06K 7/1421* (2013.01); *G06K 2007/10534* (2013.01)

(58) Field of Classification Search
CPC ....... G06F 1/163; G06F 1/1696; G06F 1/1698
USPC ....................................... 235/472.01, 472.02
See application file for complete search history.

(56) References Cited

U.S. PATENT DOCUMENTS

| 2016/0050326 A1* | 2/2016 | Lee .................... H04N 21/2223 358/402 |
| 2017/0286047 A1* | 10/2017 | Patil ...................... G06F 3/0346 |
| 2018/0101352 A1* | 4/2018 | Choi ........................ G09G 5/12 |
| 2018/0364557 A1* | 12/2018 | Park ........................ G04G 21/00 |

* cited by examiner

*Primary Examiner* — Toan C Ly
(74) *Attorney, Agent, or Firm* — Alston & Bird LLP

(57) ABSTRACT

Example embodiments relate to a wearable mobile terminal. In one embodiment, the wearable mobile terminal comprises at least one processing element and at least one memory including program code. In such an embodiment, the wearable mobile terminal is configured to capture one or more machine-readable codes and obtain data from the captured one or more machine-readable codes.

9 Claims, 6 Drawing Sheets

SYNCHRONIZED DISPLAY FOR A WEARABLE MOBILE TERMINAL

CROSS-REFERENCE TO RELATED APPLICATIONS

This application claims priority to U.S. Provisional Application No. 62/684,333 filed Jun. 13, 2018, which is hereby incorporated herein in its entirety by reference.

BACKGROUND

There is a latent need for a rigorous methodology for wearable mobile terminals that have smart scanning capabilities. Through applied effort, ingenuity, and innovation, the inventors have developed wearables and methods for the same. Some examples of these solutions are described in detail herein.

BRIEF SUMMARY

In general, embodiments of the present invention provide methods, apparatus, systems, computing devices, computing entities, and/or the like are provided.

In accordance with one aspect, a method for execution by a wearable mobile terminal is provided. In one embodiment, the method comprises capturing one or more machine-readable codes; and obtaining data from the captured one or more machine-readable codes.

In accordance with another aspect, a computer program product executable by a wearable mobile terminal is provided. The computer program product may comprise at least one computer-readable storage medium having computer-readable program code portions stored therein, the computer-readable program code portions comprising executable portions configured to capture one or more machine-readable codes; and obtain data from the captured one or more machine-readable codes.

In accordance with yet another aspect, wearable mobile terminal is provided. In one embodiment, the wearable mobile terminal is configured to capture one or more machine-readable codes; and obtain data from the captured one or more machine-readable codes.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
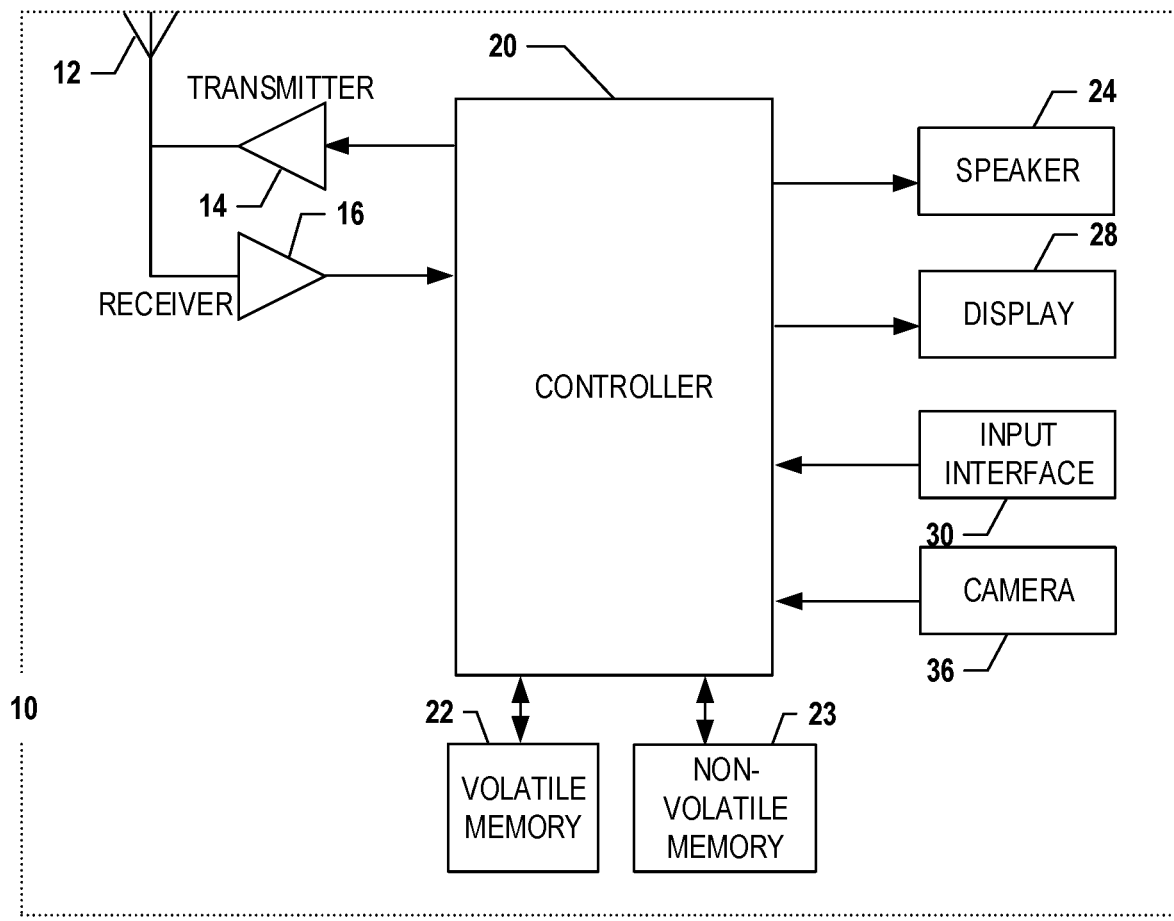
FIG. 1 is a diagram of a system that can be used to practice various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Computer Program Products, Methods, and Computing Devices

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, and/or the like. As such, embodiments of the present invention may take the form of a data structure, apparatus, system, computing device, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an environment that can be used in conjunction with various embodiments of the present invention. As shown in FIG. 1, the environment may comprise one or more mobile terminals 10, one or more user computing entities 15, one or more networks 13, and/or the like. Each of the components of the system may be in electronic communication with, for example, one another over the same or different wireless or wired networks 13 including, for example, a wired or wireless Personal Area Network (PAN), Local Area Network (LAN), Metropolitan Area Network (MAN), Wide Area Network (WAN), and/or the like. Additionally, while FIG. 1 illustrate certain system devices as separate, standalone devices, the various embodiments are not limited to this particular architecture.

Mobile Terminal

Figure 2:
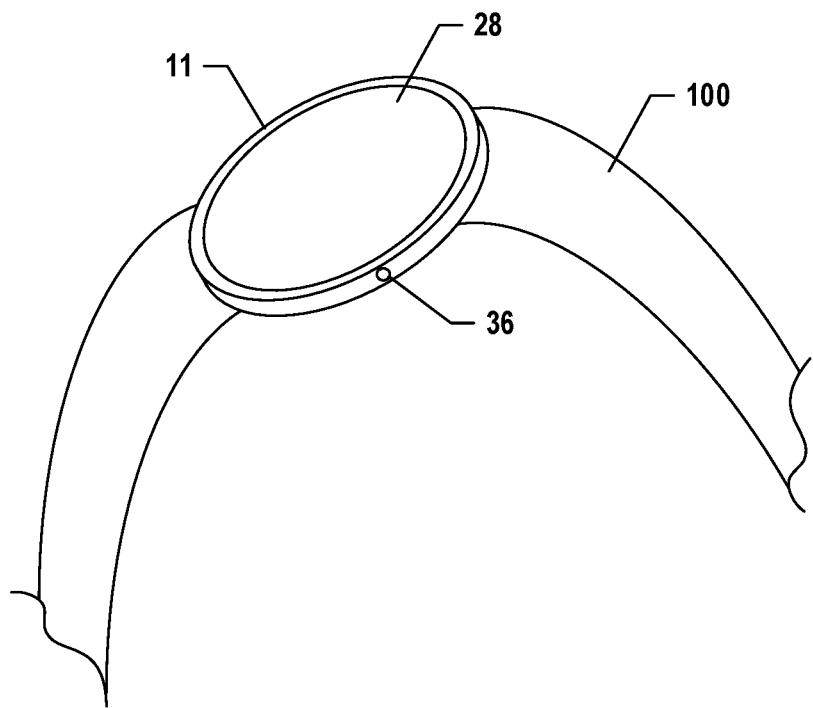
FIG. 2 shows a schematic of an example wearable mobile terminal according to various embodiments.

FIG. 2 illustrates a block diagram of a mobile terminal 10 that would benefit from the present invention. It should be understood, however, that a smart watch as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of wearable mobile terminals, such as headphones, smart glasses, watches, bracelets, augmented reality headsets, and other types of wearable mobile terminals, can readily employ the present invention. As will be recognized, the wearable mobile terminals may be may be embedded in clothing or shoes; attached as patches to the skin (e.g., headband); and worn as a necklace.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 may include an antenna 21 in operable communication with a transmitter 24 (e.g., radio) and a receiver 26 (e.g., radio). The mobile terminal 10 may further include a controller 20 or other processing element that provides signals to and receives signals from the transmitter 24 and receiver 26, respectively. The signals include signaling information in accordance with the air interface standard of an applicable wireless system to communicate with various entities. In this regard, the mobile terminal 10 may be capable of operating with one or more air interface standards, communication protocols, modulation types, and access types. More particularly, the mobile terminal 10 may operate in accordance with any of a number of wireless communication standards and protocols. In a particular embodiment, the mobile terminal 10 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile terminal 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile terminal 10 can also download changes, add-ons, and updates, for instance, to its firmware, software (e.g., including executable instructions, applications, program modules), and operating system.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a speaker 24 and/or a display 28, and/or one or more user input interfaces 25 (e.g., one or more buttons, a microphone, and/or the like), all of which are coupled to the controller 20. The user input interface, which allows the mobile terminal 10 to receive data, may include any of a number of devices allowing the mobile terminal 10 to receive data, such as a touch display or other input device. The mobile terminal 10 further includes a battery (not shown), such as a vibrating battery pack, for powering various circuits that are required to operate the mobile terminal 10, as well as optionally providing mechanical vibration as a detectable output.

In an exemplary embodiment, the mobile terminal 10 includes a camera module 27 in communication with the controller 20. The camera module 27 may be any means for capturing an image or a video clip or video stream for storage, display or transmission. For example, the camera module 27 may include a digital camera capable of forming a digital image file from an object in view, a captured image or a video stream from recorded video data. The camera module 27 may be able to capture an image, read or detect 1D and 2D barcodes, Quick Response (QR) codes, Semacode, Shotcode, data matrix codes, as well as other code-based data, OCR data and the like—such as those shown in FIGS. 4A-4D. Such codes are referred to herein as machine-readable codes. As such, the camera module 27 includes all hardware, such as a lens, sensor, scanner or other optical device, and software necessary for creating a digital image file from a captured image or a video stream from recorded video data, as well as reading code-based data, OCR data and the like. In certain embodiments, the lens, sensor, scanner, and/or the like are aligned with an aperture extending through a housing 11 of the mobile terminal 10 in such a location as to be usable as a cameral while the mobile terminal 10 is worn by a user. Alternatively, the camera module 27 may include only the hardware needed to view an image, or video stream while a memory device of the mobile terminal 10 stores instructions for execution by the controller 20 in the form of software necessary to create a digital image file from a captured image or a video stream from recorded video data. In an exemplary embodiment, the camera module 27 may further include a processing element such as a co-processor which assists the controller 20 in processing image data, a video stream, or code-based data as well as OCR data and an encoder and/or decoder for compressing and/or decompressing image data, a video stream, code-based data, OCR data and the like. The encoder and/or decoder may encode and/or decode according to a JPEG standard format, and the like. Additionally, or alternatively, the camera module 27 may include one or more views such as, for example, a first person camera view and a third person map view.

The mobile terminal 10 may further include a GPS module or other location determining aspects (not shown) in communication with the controller 20. The GPS module may be any means for locating the position of the mobile terminal 10 for example, to determine the latitude, longitude, altitude, geocode, course, direction, heading, speed, UTC, date, and/or various other information/data for the mobile terminal 10. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile terminal's 10 position in connection with a variety of other systems, including cellular towers, Wi-Fi access points, and/or the like. Similarly, the mobile terminal 10 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

Additionally, the GPS module may be any means for locating the position of point-of-interests (POIs), in images captured or read by the camera module 27, such as for example, shops, bookstores, restaurants, coffee shops, department stores, products, businesses and the like which may have 1D, 2D barcodes, QR codes, Semacodes, Shotcodes, data matrix codes, (or other suitable code-based data) ORC data and the like, attached to i.e., tagged to these POIs. As such, points-of-interest as used herein may include any entity of interest to a user, such as products and other objects and the like. The GPS module may include all hardware for locating the position of a mobile terminal or a POI in an image. Alternatively or additionally, the GPS module may utilize a memory device of the mobile terminal 10 to store instructions for execution by the controller 20 in the form of software necessary to determine the position of the mobile terminal or an image of a POI. Additionally, the GPS module is capable of utilizing the controller 20 to transmit/receive, via the transmitter 24/receiver 26, locational information such as the position of the mobile terminal 10, the position of one or more POIs, and the position of one or more code-based tags, as well OCR data tags, to a server.

The mobile terminal 10 can also include volatile storage or memory 22 and/or non-volatile storage or memory 23, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile terminal 10.

Figure 3:
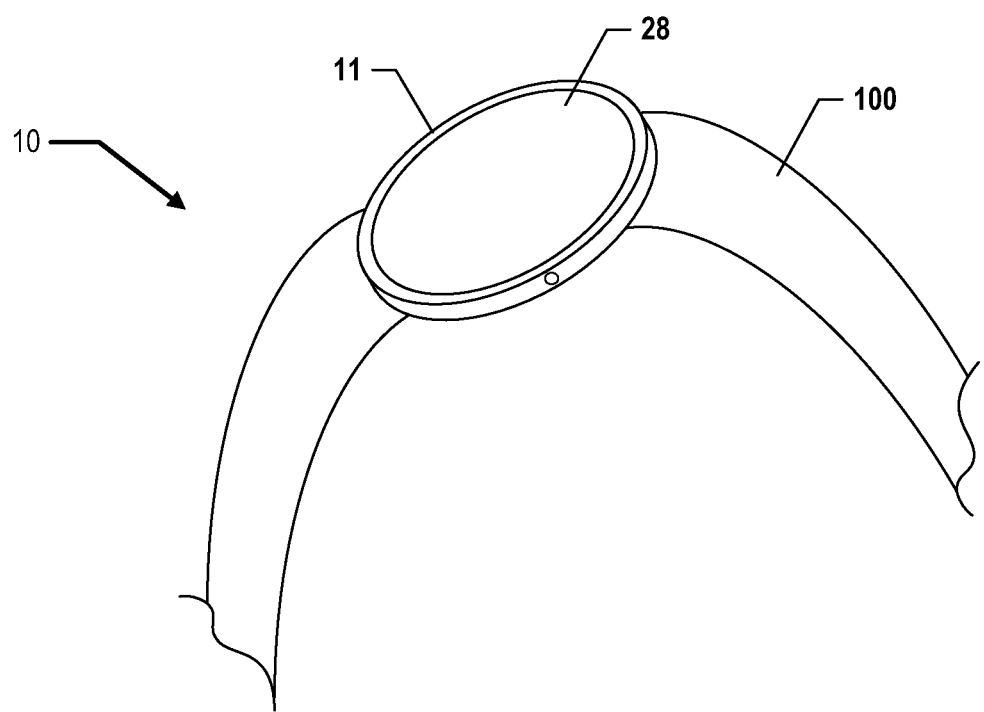
FIG. 3 shows an example configuration of a wearable mobile terminal according to various embodiments.
Figure 4A:
FIGS. 4A, 4B, 4C, and 4D illustrate exemplary machine-readable codes, in accordance with an example embodiment of the present invention.
Figure 4B:
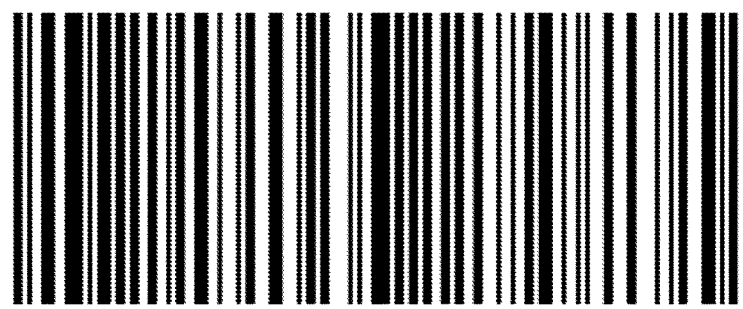
Figure 4C:
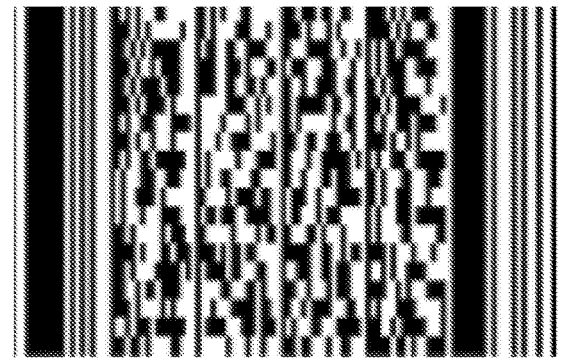
Figure 4D:
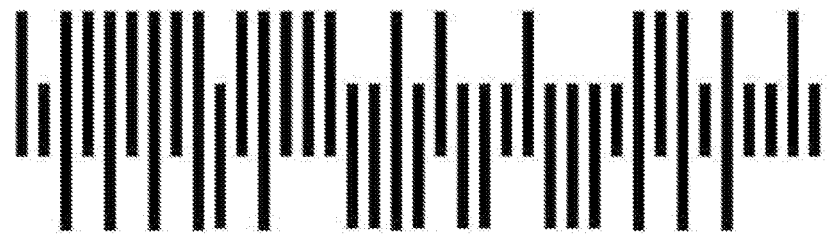

As mentioned, the mobile terminal 10 may be a wearable mobile terminal 10, thereby encompassing one or more straps, clips, bands, rings, and/or other wearable retention devices to secure the mobile terminal 10 relative to a user's body. As just one example embodiment, the mobile terminal 10 may be embodied as a watch as shown in FIG. 3 having a wrist strap/band 100 usable to secure the watch onto the user's wrist. Moreover, various embodiments may comprise body monitoring mechanisms usable while the mobile terminal 10 is secured onto a user's body. For example, the mobile terminal 10 may comprise a heart rate monitor, a body temperature monitor, and/or the like.

Because various embodiments of the mobile terminal 10 are embodied as wearable devices having associated wearable retention devices, the mobile terminal 10 may have a configuration enabling easy use of the various features in an ergonomic configuration for the user. Thus, for mobile terminals 10 configured as wearable smart watches, the camera or other imaging device may be located within a sidewall of the mobile terminal housing 11 such that the camera faces in a direction parallel or perpendicular with the user's arm (e.g., along the user's arm or across the user's arm). Thus, the mobile terminal 10 is thereby configured to enable users to image objects using the camera of the mobile terminal 10 without removing the mobile terminal 10 from the user's wrist. Moreover, because wearable mobile terminals 10 are desirably small and/or lightweight to increase the user's comfort while wearing the same, the camera lenses within the sidewalls of the mobile terminal housing 11 have a small overall size (e.g., having a diameter less than 3 mm, a diameter less than 5 mm, a diameter less than 10 mm, and/or the like) such that the lens has a diameter smaller than a traditional watch thickness.

User Computing Entity

In one embodiment, a user computing entity 15 may include one or more components that are functionally similar to those of the mobile terminal 10. For example, in one embodiment, each user computing entity 15 may include one or more processing elements (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the user computing entity 15 to interact with and/or cause display of information from the mobile terminal 10, as described herein. This may also enable the user computing entity 15 to communicate with various other computing entities, such as mobile terminals 10, and/or various other computing entities. As will be recognized, these architectures and descriptions are provided for exemplary purposes only and are not limiting to the various embodiments.

III. Exemplary System Operation

As will be recognized, certain communication technologies and protocols have range limitations for directly connecting to and/or directly communicating with computing entities (e.g., point-to-point, peer-to-peer, WLAN, WPAN, and/or the like). For example, various Bluetooth technologies may have range limitations from 20 feet to 300 feet. NFC technologies may have range limitations of less than 12 inches. Wi-Fi Direct may have range limitations of 600 feet. Thus, depending on the application or context of the notifications desired, various communication technologies and protocols can be used to adapt to various needs and circumstances. For instance, Bluetooth technologies may be used to determine/identify when a child is on (e.g., connected to) a school bus. Wi-Fi Direct technologies may be used to determine/identify when a child is at school. NFC technologies may be used to determine when a person is at a checkout, near a particular display in a store, being waitlisted at a restaurant, and/or the like. As will be recognized, a variety of other approaches and techniques can be used to adapt to various needs and circumstances.

Figure 5:
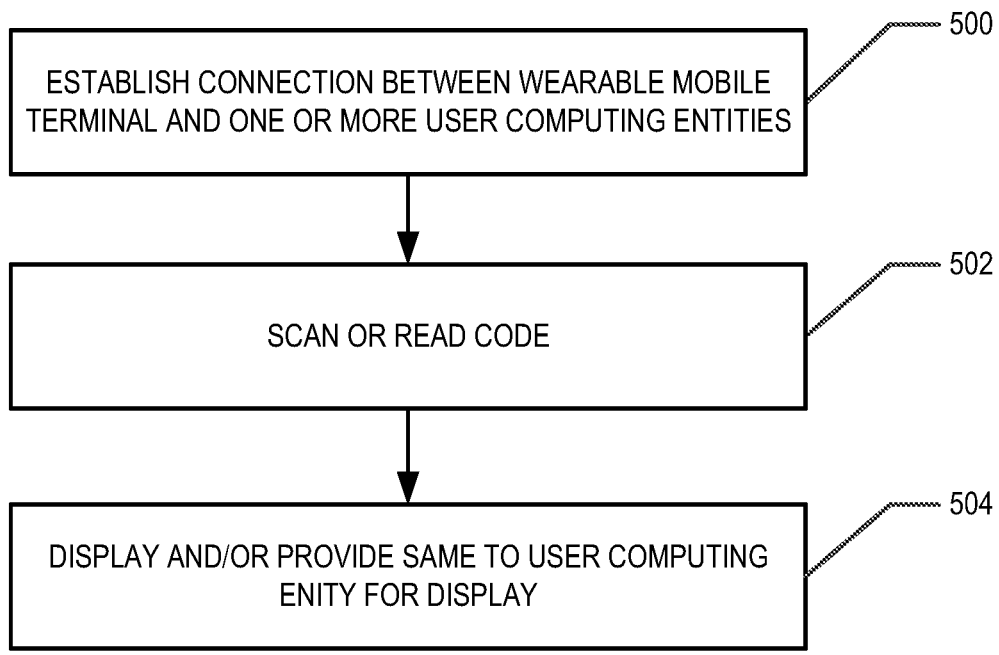
FIG. 5 provides a flowchart illustrating example steps, processes, procedures, and/or operations for generating profile token, in accordance with an example embodiment of the present invention.

In one embodiment, a mobile terminal 10 can be used to establish a connection with one or more user computing entities 15 for display or synchronized display (step/operation 500 of FIG. 5). For instance, in the Bluetooth context, a mobile terminal 10 can connect with multiple devices simultaneously with each device being with 30-foot radius. In essence, Bluetooth systems create personal-area networks (PANs) or piconets that may fill an area, room, or vehicle. To create a connection between a mobile terminal 10 and a user computing entity 15 a trusted relationship is established between the devices using a password (e.g., credential information/data) that can be stored by each device for future connection attempts (e.g., the devices are paired). After computing entities have been paired, establishing a connection begins with a phase called "inquiry" through which a mobile terminal 10 sends an inquiry request to all user computing entities 15 found within its range. The user computing entities 15 within range would then receive the query and reply. The mobile terminal 10 then synchronizes with the various user computing entities 15 within range. Once the computing entities are connected (e.g., the connection is established), the mobile terminal 10 can provide information/data for display by the user computing entity 15. As will be recognized, other communication technologies and protocols (e.g., NFC, Wibree, HomeRF, SWAP, Wi-Fi Direct, and/or the like) can be used in a similar manner in terms of connecting and disconnecting with user computing entities 15. That is, the other communication technologies and protocols can establish connections between mobile terminals 10 and user computing entities 15.

As indicated at step/operation 502 of FIG. 5, the mobile terminal 10 can be operated by a user to capture, scan, read, and/or similar words used herein interchangeably one or more codes. For example, as noted previously, the camera module 27 of the mobile terminal 10 may be able to capture an image, read or detect 1D and 2D barcodes, QR codes, Semacode, Shotcode, data matrix codes, as well as other code-based data, OCR data and the like—such as those shown in FIGS. 4A-4D. Once captured, the mobile terminal 10 may further process the captured data to extract, obtain, and/or decode the information/data contained or referenced therein. In one example, the mobile terminal 10 can extract or decode information/data in the captured data. In another example, the code may comprise a URL which can be accessed by the mobile terminal to obtain information/data. As will be recognized, a variety of techniques can approaches can be used to adapt to various needs and circumstances.

Figure 6:
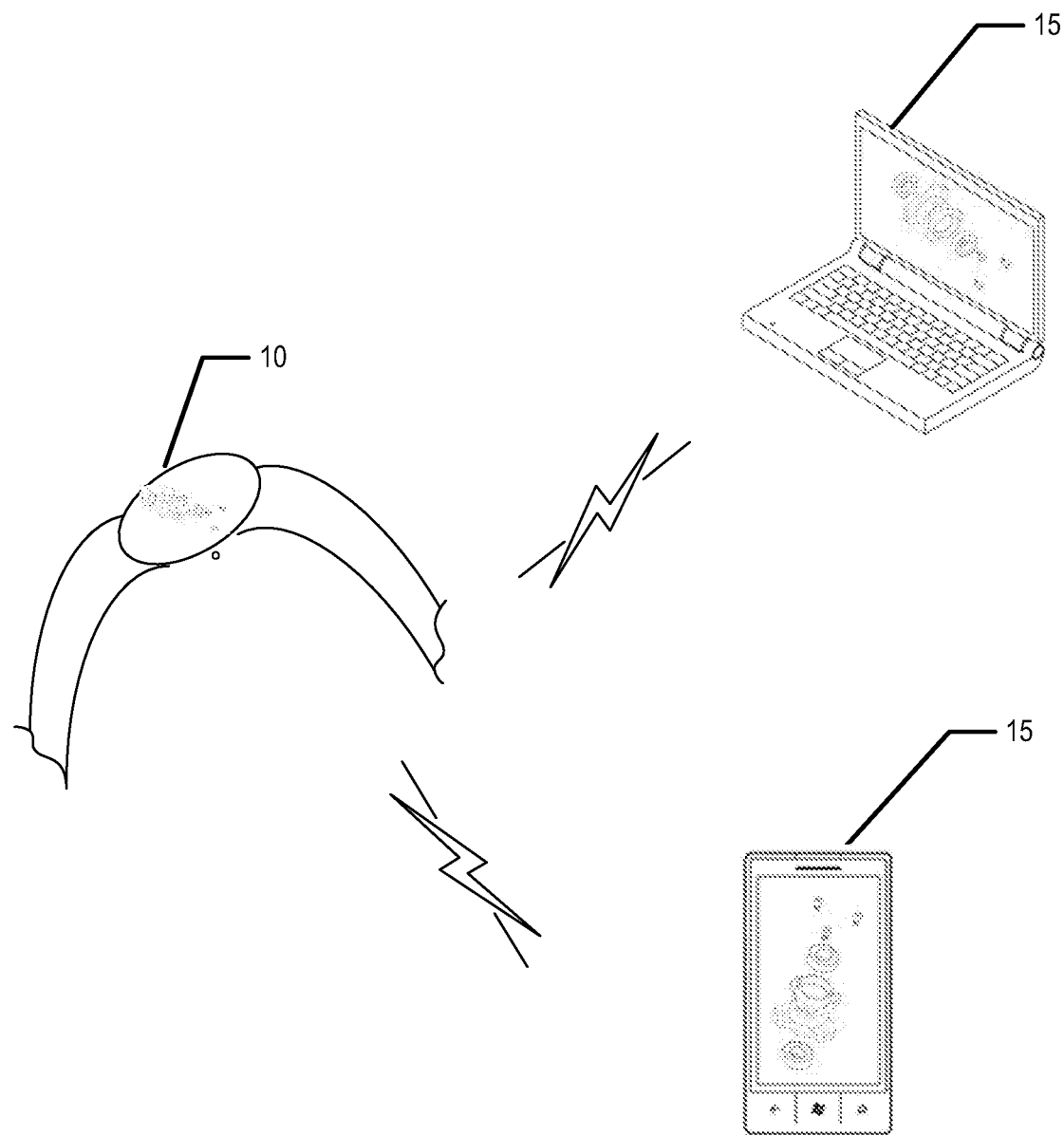
FIG. 6 provides an illustrative embodiment in which the wearable mobile terminal and user computing entities are causing simultaneous display of data obtained from a machine-readable code.

As indicated at step/operation 504 of FIG. 5, the mobile terminal 10 can display the extracted, obtained, decoded information/data via an interface. Similarly, the mobile terminal 10 can provide the extracted, obtained, decoded information/data to one or more user computing entities 30 for display. As will be recognized, the one or more user computing entities 30 can cause simultaneous display of the information/data with each other and/or the mobile terminal 10 (see FIG. 6).

IV. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wearable mobile terminal comprising at least one processing element and at least one memory including program code, the at least one memory and the program code configured to, with the processing element, cause the wearable mobile terminal to at least:
capture one or more machine-readable codes;
extract data from the captured one or more machine-readable codes;
automatically establish, based at least in part on the extracted data from the one or more machine readable codes, a communication session with a user computing entity;
cause display of at least a portion of the extracted data; and
transmit the at least a portion of the extracted data to the user computing entity, wherein the user computing entity causes display of the at least a portion of the extracted data simultaneous to the wearable mobile terminal causing display of the at least a portion of the extracted data.

2. The wearable mobile terminal of claim 1, wherein the machine-readable codes are selected from the group consisting of barcodes, Quick Response codes, Semacodes, Shortcodes, and data matrix codes.

3. The wearable mobile terminal of claim 1, wherein the wearable mobile terminal is a smart watch, embedded in clothing, or attached as a patch to skin.

4. A method executed by a wearable mobile terminal, the method comprising:
capturing one or more machine-readable codes;
extracting data from the captured one or more machine-readable codes;
automatically establishing, based at least in part on the captured machine-readable codes, a communication session with a user computing entity;
causing display of at least a portion of the extracted data; and
transmitting at least a portion of the extracted data to the user computing entity, wherein the user computing entity causes display of the at least a portion of the extracted data simultaneous to the wearable mobile terminal causing display of the at least a portion of the extracted data.

5. The method of claim 4, wherein the machine-readable codes are selected from the group consisting of barcodes, Quick Response codes, Semacodes, Shortcodes, and data matrix codes.

6. The method of claim 4, wherein the wearable mobile terminal is a smart watch, embedded in clothing, or attached as a patch to skin.

7. A computer program product for execution by a mobile wearable terminal, the computer program product comprising at least one non-transitory computer-readable storage medium having computer-readable program code portions stored therein, the computer-readable program code portions comprising:
an executable portion configured to capture one or more machine-readable codes;
an executable portion configured to extract data from the captured one or more machine-readable codes;
an executable portion configured to automatically establish, based at least in part on the captured machine-readable codes, a communication session with a user computing entity;
an executable portion configured to cause display of at least a portion of the extracted data; and
an executable portion configured to transmit at least a portion of the extracted data to the user computing entity, wherein the user computing entity causes display of at least a portion of the extracted data simultaneous to the wearable mobile terminal causing display of at least a portion of the extracted data.

8. The computer program product of claim 7, wherein the machine-readable codes are selected from the group consisting of barcodes, Quick Response codes, Semacodes, Shortcodes, and data matrix codes.

9. The computer program product of claim 7, wherein the wearable mobile terminal is a smart watch, embedded in clothing, or attached as a patch to skin.

\* \* \* \* \*